United States Patent
Ahmadi et al.

(10) Patent No.: US 9,870,592 B2
(45) Date of Patent: Jan. 16, 2018

(54) PROCESS ENERGY INTENSITY MONITORING AND DIAGNOSTIC SYSTEM

(71) Applicant: CANTECH INDUSTRIES, LLC, Escondido, CA (US)

(72) Inventors: Majid Ahmadi, San Diego, CA (US); Cody Riddar, San Diego, CA (US); Andrew Leishman, Mission Viejo, CA (US)

(73) Assignee: CANTECH INDUSTRIES, LLC, Escondido, CA (US)

( * ) Notice: Subject to any disclaimer, the term of this patent is extended or adjusted under 35 U.S.C. 154(b) by 752 days.

(21) Appl. No.: 14/218,941

(22) Filed: Mar. 18, 2014

(65) Prior Publication Data
US 2015/0268282 A1  Sep. 24, 2015

(51) Int. Cl.
*G01R 21/00* (2006.01)
*G01R 15/00* (2006.01)
*G06Q 50/04* (2012.01)
*G06Q 90/00* (2006.01)

(52) U.S. Cl.
CPC ............. *G06Q 50/04* (2013.01); *G06Q 90/00* (2013.01); *Y02P 90/30* (2015.11); *Y02P 90/84* (2015.11)

(58) Field of Classification Search
CPC ...... G06Q 90/00; G06Q 50/04; G01R 21/133; G05B 15/02
USPC ................................................ 702/57, 60–62
See application file for complete search history.

(56) References Cited

U.S. PATENT DOCUMENTS 9,196,009 B2 * 11/2015 Drees .................... G05B 15/02

* cited by examiner

*Primary Examiner* — An Do
(74) *Attorney, Agent, or Firm* — Gary L. Eastman, Esq.; Eastman & McCartney LLP

(57) ABSTRACT

A Process Energy Intensity Monitoring and Diagnostic System designed to evaluate the amount of energy input into a process and the resulting product output, and comparing the resulting energy intensity (energy per unit produced) calculation with a statistical average, or preferred value. Further, the system will isolate energy intensity data points that occur outside statistically derived upper or lower control limits. The system will collect information from specific equipment within a manufacturing or production process. This information will be transmitted to the central database that will store, calculate, and deliver real time and historical consumption, production, and energy intensity data to connected client devices. Client devices may include computers, smartphones, or web browsers.

10 Claims, 10 Drawing Sheets

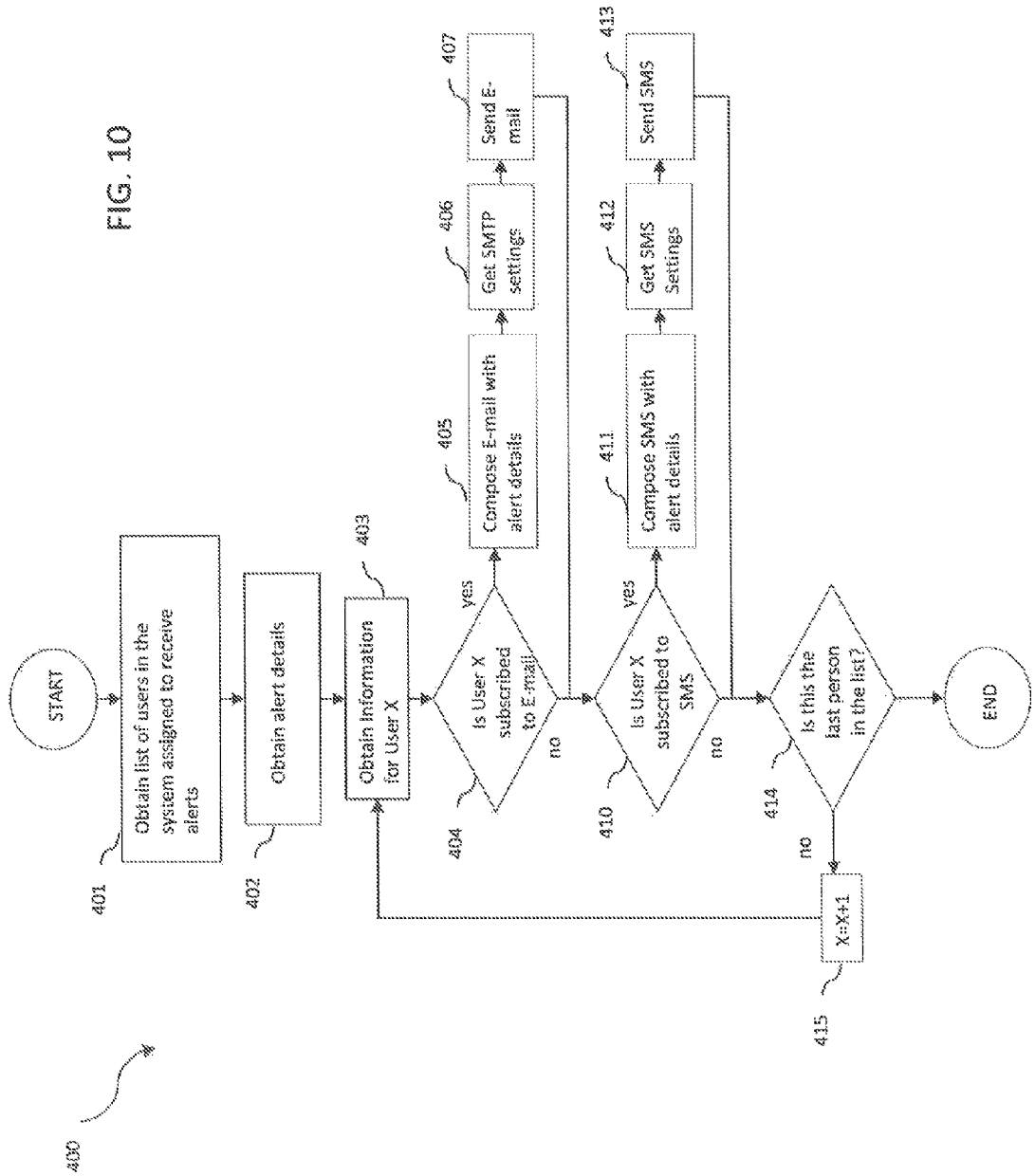

PROCESS ENERGY INTENSITY MONITORING AND DIAGNOSTIC SYSTEM

FIELD OF INVENTION

The present invention relates generally to an energy and production monitoring, analysis, and reporting system. The present invention is more particularly, though not exclusively, related to an energy and production monitoring, analysis, and reporting system for industrial manufacturing processes consisting of multiple operations to produce a finished product.

BACKGROUND OF THE INVENTION

The cost of goods has steadily increased due to the increasing cost of production and manufacturing. The increase in cost of manufacturing may be contributed to many factors such as the increased cost of labor, increased cost of materials, and increased cost of energy. However, the increase cost of natural resources has the greatest influence on the cost of manufacturing and production of goods as it influences the cost of raw materials and the cost of energy. With manufacturing and production of goods increasing worldwide and with only a finite amount of natural resources to support the increase, the cost of natural resources will continually rise and the availability of the natural resources will diminish. Additionally, with the increased concern of global warming and the environment, the increase in use of natural resources will also increase the amount of greenhouse gas emissions. The burning of fossil fuels is a major source of greenhouse gas emissions, especially for production and manufacturing facilities which rely on fossil fuels in the form of coal, electricity derived from coal, natural gas, and oils. As a result, manufacturing and production companies have begun to look for ways to become more efficient by looking to achieve maximum product output from minimum resources consumed.

Natural resources are consumed in the production and manufacturing processes through the use of raw materials made from natural resources or through the energy created from natural resources. Better product designs, production processes, and tighter controls have decreased the amount of wasted raw materials in the production and manufacturing of goods. Most manufacturing companies have taken steps to reduce their energy consumption by replacing old, inefficient equipment with the energy efficient ones. However, replacing the old machines has its limits. Therefore, many companies have switched their focus on improving and optimizing the manufacturing or production process itself as a means of increasing energy efficiency, particularly the desire to monitor the relationship between energy and the associated costs versus production.

Product manufacturing or production optimization focuses on optimizing equipment use, operating procedures, or control procedures. Optimization can increase the efficiency of energy use by the production manufacturing process by decreasing the amount of time required to perform an operation, removing labor intensive operations, removing redundant steps, or removing operations which consume too much energy. Presently there are systems that are designed to monitor the operation of any component within a process. However none offer the comparison between the energy input to the production or manufacturing process and the output of the process (energy per unit produced). The current systems only offer aggregated process monitoring to look at the production and manufacturing process at a macro level and not at a micro level. Consequentially, the comparable technologies lack any statistical evaluation of the process energy intensity, the amount of energy used per unit of production. For this reason, present systems cannot accurately determine if the energy consumption of a production process can be attributed to, or affected by, a change in production, or equipment failure.

It is therefore, a principal object of this invention to provide a system that displays in an easily understandable form, the relationship of energy consumption and production output continuously in real-time as well as in summarized reports updated in real-time as well.

It is another object of this invention to provide a system that displays in an easily understandable form, the relationship of energy consumption and production output, as it compares to a historical average of energy consumption and production output.

It is a further object of this invention to provide a system that displays in an easily understandable form, the relationship of energy consumption and production output, as it compares to expected energy consumption and production output, and subsequently display a report of instances where energy consumption and production output exceeds preferred or statistical expectations.

It is a further object of this invention, to provide a system that will provide a warning, via a connected client interface, or electronic communication such as email, SMS, or other communication network, as to when the production system exceeds preferred or statistical expectations.

SUMMARY OF THE INVENTION

The Process Energy Intensity Monitoring and Diagnostic System of the present invention is a first-of-its-kind energy monitoring system that provides production wide view of energy consumption as well as a per unit per product view of energy consumption. The Process Energy Intensity Monitoring and Diagnostic System can track energy use, and unit production, down to each individual piece of equipment in the manufacturing process, in order to provide complete analysis of where energy is being expended, and how much is being expended to produce one unit of one product.

The Process Energy Intensity Monitoring and Diagnostic System monitors the individual operations of a manufacturing process and calculates the "energy intensity" and "carbon intensity" of each individual finished product produced. Energy intensity, or the amount of energy used per unit of production, is obtained by dividing the energy consumption for the production period being monitored, by the total production in that period. Carbon intensity, or the amount of $CO_2$ emitted per unit of production, is obtained by multiplying the energy consumption for the production period being monitored, by an industry standard constant, and then dividing that by the total production in that period.

The advantages of energy intensity and carbon intensity over traditional methods of measuring energy is it allows the determination of the energy consumption, energy efficiency, and cost-effectiveness, on a per unit basis. Currently, the efficiency of a process was determined by the efficiency of each operation and its corresponding machine or apparatus, failing to accurately determine if the energy consumption of the production process is attributed to, or affected by, a change in the production process or equipment failures. Additionally, current technology lacks the ability to statistically evaluate the process energy intensity and carbon intensity.

The Process Energy Intensity Monitoring and Diagnostic System includes a Data Acquisition System, Data Processing and Analysis System, and a Graphical User Interface System/Software Application, which work in conjunction to provide a user with the ability to monitor the individual operations of a production/manufacturing process and the energy and carbon intensity of its produced products.

The Data Acquisition System includes sensors and/or monitors which are attached to the individual machines or apparatus associated with an operation in the production/manufacturing process. The sensors and/or monitors are non-intrusive and easy to install, requiring little work and effort. The sensors and/or monitors are connected to a data acquisition device which receives the raw data from the sensors and/or monitors and converts it into useable data which is then subsequently transmitted to the Data Processing and Analysis System through local connections or through the web.

The Data Processing and Analysis System performs the majority of the data processing. The Data Processing and Analysis System stores all the measured and calculated data; processes the information by performing calculations and statistical analysis; and organizes and prepares the data into user useable formats. The Data Acquisition System and Data Processing and Analysis System are self-contained and do not require a hard connection between the two systems. As a result, the Data Processing and Analysis System can be off-site while the Data Acquisition System is on-site, providing greater flexibility by allowing a single Data Processing and Analysis System to work with multiple Data Acquisition Systems.

The Graphical User Interface System/Software Application allows the information processed by the Data Processing and Analysis System to be at the fingertips of any user. The Graphical User Interface System/Software Application is a software application which may be implemented into a variety different computing devices such as a personal computer, a laptop, a tablet or a smartphone. The computing device with the software application can access the information processed by the Data Processing and Analysis System through a local connection or across the web, allowing the user to gain access to information of a monitored system, process, or equipment almost anywhere.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which:

FIG. 10 is a flow chart of the process of alerting a user when energy, resource, production, or intensity values exceed a statistical or preferred range.

DETAILED DESCRIPTION OF THE INVENTION

Figure 1:
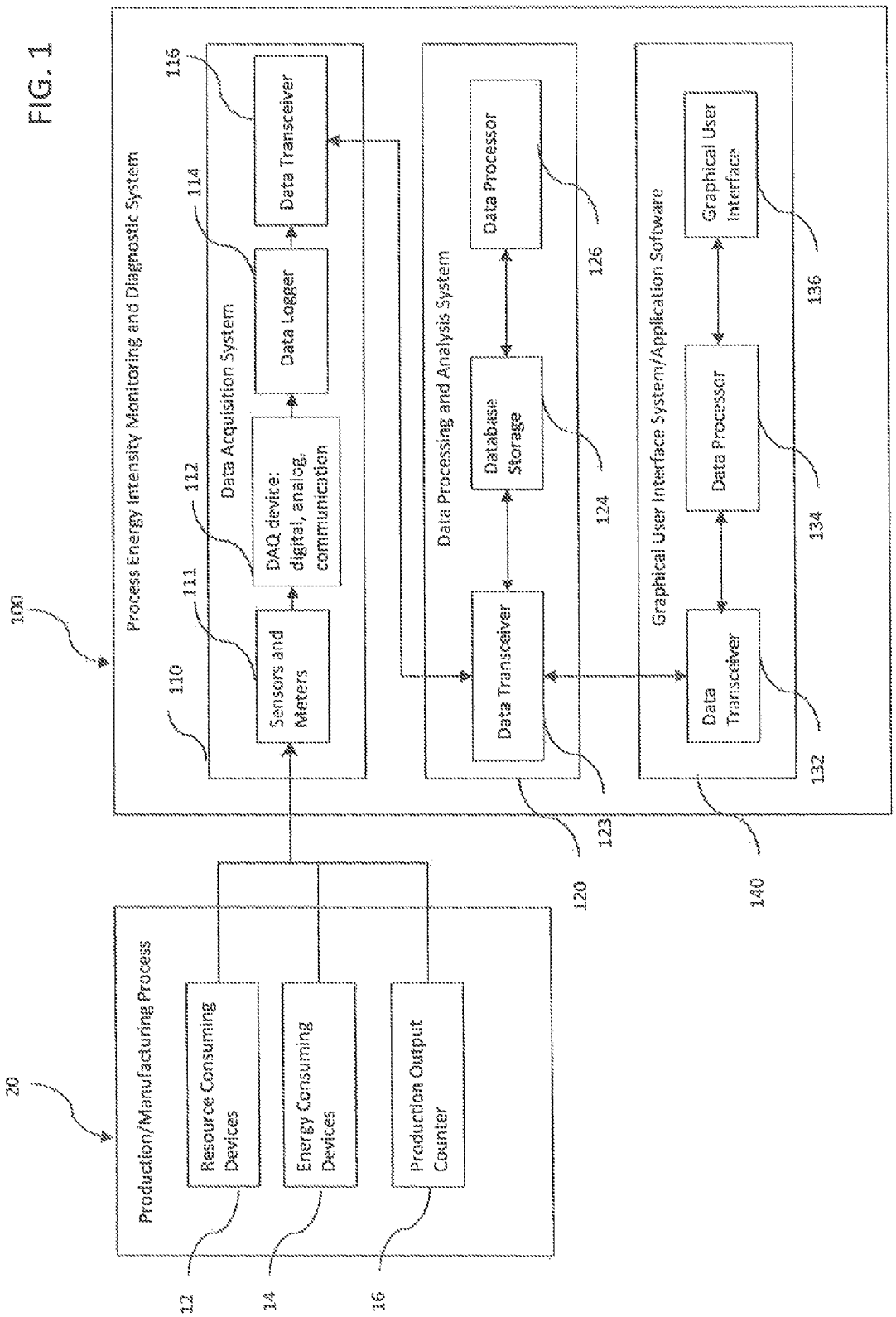
FIG. 1 is a block diagram of the Process Energy Intensity Monitoring and Diagnostic System of the present invention showing the Data Acquisition System, a Data Processing and Analysis System, and a Graphical User Interface System/Application Software.

Referring initially to FIG. 1, a block diagram of the Process Energy Intensity Monitoring and Diagnostic System of the present invention is shown and generally designated 100. The Process Energy Intensity Monitoring and Diagnostic System 100 monitors the individual operations of a manufacturing process 10 and calculates the energy expenditure used to determine the "Energy Intensity" and "Carbon Intensity," among other calculations, of each individual finished product produced.

The invention relates to energy and production monitoring, analysis, and reporting system, and more particularly, to a system for comparing actual energy consumption with actual production output, and statistically determining if the resulting value is within a statistically derived expected range, or within a preferred range. The statistical analysis is performed on a computer that has received the energy and production data via electronic transmission. After processing the energy and production data received, the system will display various tables, charts, graphs, reports, and automated alerts to operators, managers, and owners of the production facility via a connected computer or smartphone based client.

The system is generalizable to any process and the end-user will be able to monitor and evaluate the process in real-time. In addition to aggregated process monitoring, the system is also able to segregate individual components within the process and retrieve component specific performance values for the end-user. This level of granularity in data collection allows the end-user to evaluate all aspects of the process including: Component Performance, Operational Changes and Control Changes. The purpose of this information is to identify the primary consumers of energy to the end-user and assist in the optimization of the process with "energy per unit produced" as a significant factor of consideration.

The advantages of energy intensity and carbon intensity over traditional methods of measuring energy is it allows the determination of the energy consumption, energy efficiency, and cost-effectiveness, on a per unit basis. Currently, the efficiency of a process was determined by the efficiency of each operation and its corresponding machine or apparatus, failing to accurately determine if the energy consumption of the production process is attributed to, or affected by, a change in production or equipment failures. Additionally, current technology lacks the ability to statistically evaluate the process energy intensity and carbon intensity.

The Process Energy Intensity Monitoring and Diagnostic System 100 of the present invention provide real-time evaluation of the energy intensity and carbon intensity for a targeted process as data is continually collected and updated by the system. Utilizing the real-time data in conjunction with the real-time energy intensity and carbon intensity data, statistical values are calculated and updated in real-time as well. The data reflects the energy consumption, energy efficiency, and cost-effectiveness, on a per unit basis, of the monitored manufacturing process. The reap time data is able to measure and communicate any change in the energy consumption, energy efficiency, and cost-effectiveness of the manufacturing process in real-time as a response to a change in the manufacturing process. The Process Energy Intensity Monitoring and Diagnostic System 100 provide pertinent information to assist in the optimization of the process, with the energy intensity as a significant factor for consideration.

By being able to optimize the production/manufacturing process, energy consumption is minimized. Minimizing energy consumption results in reduced operation cost. Additionally, the reduction in use of energy per unit output reduces the amount of emissions emitted per unit output produced, specifically carbon dioxide. With stricter environmental regulations, the production of carbon is strictly regulated. A company is restricted in the amount of carbon dioxide it may produce as a byproduct and is issued carbon credits, a certificate showing that a company is able to produce one ton of carbon dioxide as a byproduct. Any unused carbon credits may be traded or sold on the open market. By reducing the amount of carbon output, a company may sell their unused carbon credits thereby saving the environment and increasing profits at the same time.

As shown, the Process Energy Intensity Monitoring and Diagnostic System 100 include a Data Acquisition System 110, a Data Processing Analysis System 120 and a Graphical User Interface System/Application Software 140.

The Process Energy Intensity Monitoring and Diagnostic System 100 interacts with the Production/Manufacturing Process 20 through the use of various data sensors and meters 111 of the Data Acquisition System 110. The data sensors and meters 111 are the only physical apparatuses which come into contact with the Production/Manufacturing Process 20. The sensors and meters 111 are attached to each machine or apparatus associated with an operation within the Production/Manufacturing Process 20 including resource consuming devices 12, energy consuming devices 14, and production output counters 16. This allows the precise measurement of all the physical data from the production/manufacturing process and converts them into data signals. In certain production/manufacturing processes, proprietary sensors may be integrated within its control system and the control system may have the ability to output the proprietary sensor data through its control panel. In these circumstances, the Data Acquisition System 110 may connect to the control panel with a direct communications signal reader (shown in FIG. 5) and read the proprietary sensor data, bypassing the need for the use of external sensors.

The data signals, in the form of digital, analog, or communication signals are read by a Data Acquisition Device 112, which includes digital, analog, and communication protocol readers, and converted into sensor data. The data is subsequently stored in a data logger 114. The data is then transmitted through a data transceiver 116 of the Data Acquisition System 110 to the Data Processing and Analysis System 120 for storage and processing of the data.

The Data Processing and Analysis System 120 includes a data transceiver 123, database storage 124, and a data processor 126. The data transceiver 123 includes both a transmitter and a receiver, and therefore can receive and transmit data, commands, and various other signals. The sensor data is stored in database storage 124. The data processor 126 processes the raw data by performing calculations, analysis, or other process and stores the results in the database storage 124 as well.

The User Graphical Interface System/Application Software 140 is a software application integrated into user hardware such as a personal computer, tablet, laptop, or smartphone. The data transceiver 132 of the hardware system retrieves the requested data in which the user requested and the hardware processor 134 in conjunction with the software application further process the information into the user requested data. The data is then displayed in the graphical user interface 136 on the user's hardware. The application software may be preinstalled on user hardware or alternatively in an application accessible through the web.

The Process Energy Intensity Monitoring and Diagnostic System 100 of the Present invention provide the information on the energy intensity and carbon intensity of a Production/Manufacturing Process 20 at your fingertips. The Process Energy Intensity Monitoring and Diagnostic System 100 tracks the energy use, and production, down to each individual piece of equipment, in order to provide complete analysis of where your energy is being used, and how much is being used to produce one unit of one product.

Figure 2:
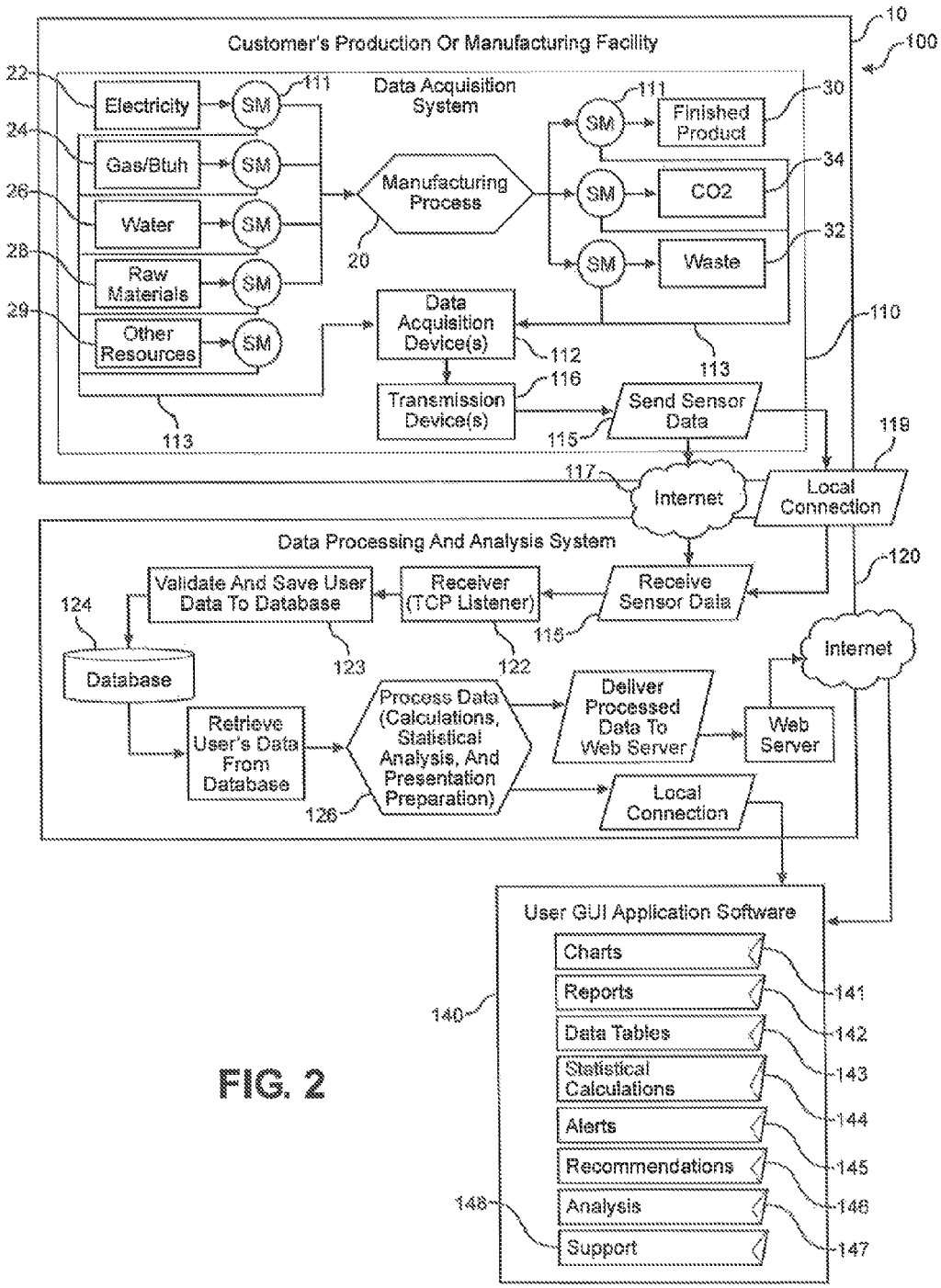
FIG. 2 is a block diagram of the Process Energy Intensity Monitoring and Diagnostic System monitoring a Customers Production/Manufacturing Facility 10.

Referring now to FIG. 2, a block diagram of the Process Energy Intensity Monitoring and Diagnostic System 100 monitoring a Customer's Manufacturing Process 20 of a Manufacturing Facility 10 is shown. The Process Energy Intensity Monitoring and Diagnostic System 100 is tracking the energy use, and production, down to each individual piece of equipment, in order to provide complete analysis of where the energy is being used, and how much is being used to produce one unit of one product.

The manufacturing process 20 is a set of sequential operations established in a facility where materials are put through a refining process to produce an end-product. Each sequential operation typically involves a machine or apparatus 22 utilized to perform the operation on the working material. To perform the required operation, the machine or apparatus consumes resources such as electricity 22, gas 24, water 26, raw materials 28, or any other resource 29 as required. As a result, each machine or apparatus and associated operation has a corresponding resource consumption value (electricity used, gas used, water used, etc.).

To measure the resource consumption value of each operation, sensors 111 are attached to each individual machine or apparatus. By attaching sensors 111 to each machine or apparatus, the resource consumption value of the entire operation can be accurately measured. The sensors and monitors 111 are fully compatible with industry standard machines and apparatuses. The installation and operation of the sensors and meters 111 do not affect the performance or operation of the machine or apparatus. Alternatively, if a production/manufacturing process has integrated sensors, the Process Energy Intensity Monitoring and Diagnostic System 100 may be implemented into the production/manufacturing process to read the integrated sensors, thereby bypassing the need to install external sensors. The Process Energy Intensity Monitoring and Diagnostic System 100 may tap directly to the integrated sensors or to the control system of the production/manufacturing process to read the integrated sensor data.

According to the type of resource consumed, sensors or meters 111 might include, but are not limited to, current transducers (CT) for electricity, flow meters for fluids, or communication protocol readers which integrate with existing meters or process equipment. Some of the resource consumption values or inputs to the manufacturing process that might be monitored and counted are, but not limited to: electricity, in the form of amps, kW, or kWh; gas, in the form of Btu or Btuh; water, or other liquids; raw materials, used directly in the production of the goods; or other resources, which might be determined by the customer as significant in the manufacturing process. Depending on the manufacturing process 20, supporting products or materials may also be measured as an input to the system. This could include scrap material, packaging materials, pre-forms, purchased water and many other variables that are process and facility specific. Depending on customer's preferences and the availability of the information, this data can be liquidated back into an energy value or left simply as a material input. The monitoring device used to measure these items will be customized to each process it is applied to.

Along with resource consuming machines and apparatuses, sensors and/or meters will also be connected to the equipment of the manufacturing process in order to measure a count of the number of finished product 30 or units produced by the manufacturing process 20. The sensor and/or meter may be connected to the first machine in the process, to the last machine in the process, or to any machine in-between, if a goods counter sensor is not present in the manufacturing process, a standalone counter may be implemented into the process. The monitoring device utilized for this application will vary greatly from process to process as this reference point will be highly customized to the system configuration. Monitoring may also occur at the exhaust or waste cycle in the manufacturing process to monitor the amount of waste, in order to help determine the overall efficiency of a manufacturing process. By products from the exhaust or waste cycle may be raw material waste 32 or carbon dioxide 34.

The production or manufacturing process 20 is one of many operations performed in a production or manufacturing facility 10. Other resource intensive operations include building operations, worker accommodations, and various other operations required to keep a production or manufacturing facility in operation. Each particular operation of the facility has a related resource consumption associated with its operation and each individual function may also be examined and combined with the production or manufacturing process to further define and determine the production cost of an individual product piece in a macro view, rather than a micro view if desired. In a particular embodiment, the production or manufacturing line is the only operation of the production or manufacturing facility being monitored by the Process Energy Intensity Monitoring and Diagnostic System 100.

As shown in the diagram, the Data Acquisition System 112 is the only system of the Process Energy Intensity Monitoring and Diagnostic System 100 which requires being on-site. The sensors and meters 111 are required to by physically coupled to the machine or apparatus associated with the manufacturing process 20. The sensors and meters 111 are electrically coupled to the Data Acquisition Device 112, in which the Data Acquisition Device 112 receives raw data 113 in the form of analog signals, digital signals, or communication protocol signals and converts it into raw sensor data 115. The Data Acquisition Device 112 retrieves and logs the raw data 113 recorded by the sensors and meters 111. The Data Acquisition Device 112 may include a logging device 114 (not shown) which may operate within the MODBUS network, a server or PC, or a mobile device consisting of a proprietary Operating System (OS). The communications between the logging device(s) 114 of the Data Acquisition System 112 and the transmission device(s) 116 is anticipated to utilize MODBUS, however the method of communication is highly adaptable and is anticipated to change as technologies progress. Once the data is logged, it is ready for periodic transmission and permanent storage to a server in the system.

The Data Acquisition System 110 includes a transmission device 116 such as a transceiver, a transmitter, or other communications device capable of sending and receiving data signals. The transmission device 116 will have the capabilities of sending and receiving data signals through a local connection 119 (such as through LAN, WAN, WWAN) or through wirelessly through the Internet 117. As a result, the Data Processing and Analysis System 120 can be located on-site or off-site providing greater flexibility by allowing a single Data Processing and Analysis System 120 to function with multiple Data Acquisition Systems 110.

To transmit the data through the Internet, either to an on-site or off-site server, computer, or etc., the transmission device 116 will test if a valid connection to the Internet is established. It will attempt to create a connection to the Internet using an ethernet connection, an internal cellular data connection to an Internet Service Provider (ISP), or a secondary device which is specifically set up to send data over the Internet. This secondary device may consist of any type of router, Wi-Fi, LAN, WAN, or cellular modem combination which has a data connection account through an the customer's own network, or through an ISP.

Once a connection to the Internet is established, the transmission device 116 will look for a predetermined web address and port that is actively accepting requests (the "Receiver" device) via TCP/IP in TCP, REST, RTU, SCADA, MODBUS, or similar architecture, if a valid web address and port is found, the transmission device 116 will be validated 123 by the Data Processing and Analysis System 120, specifically the data transceiver 122 and establish a connection. The Data Processing and Analysis System Data Transceiver 122 will begin receiving the transmission, and subsequently storing the sensor data 115 in a database 124.

Alternatively, the transmission device may by connected by a local connection 119 which sends the data signal in TCP, REST, RTU, SCADA, MODBUS, or similar architecture directly to the data transceiver 122 of the Data Processing and Analysis System 120 of the present invention.

Utilizing the stored and catalogue data for resource consumption and the number of production units, the energy intensity and carbon intensity per unit produced can be calculated by a data processor 126. Energy intensity, or the amount of energy used per unit of production (one of the processed goods), is obtained by dividing the energy consumption for the production period being monitored, by the total production in that period. Carbon intensity, or the amount of $CO_2$ emitted per unit of production, does not require the use of a carbon dioxide sensor to calculate. The carbon intensity is obtained by multiplying the energy consumption for the production period being monitored, by an industry standard constant, and then dividing that by the total production in that period.

The advantage of energy intensity and carbon intensity over traditional methods of measuring energy is it allows the determination of the energy consumption, energy efficiency, and cost-effectiveness, on a per unit basis. Currently, the efficiency of a process was determined by the efficiency of each operation and its corresponding machine or apparatus, failing to accurately determine if the energy consumption of the production process is attributed to, or affected by, a change in production or equipment failures. Additionally, current technology lacks the ability to statistically evaluate the process energy intensity and carbon intensity.

The calculated energy intensity and carbon intensity along with the raw data are further processed to determine statistical factors such as the mean, standard deviation, upper control limits, lower control limits, and various other values not mentioned but pertinent to statistical analysis. The server may also process the raw data as it is being received in order to determine if any values are outside of an acceptable range, such as the upper and lower control limits previously calculated. If any values fall outside of the acceptable range, an alert may be sent to the customer, or the invention administrators, or both, noting them of the outlying data point. This alert may also contain recommendations, custom analysis, generalized analysis, support information, or reasoning, regarding the outlying data point.

Once all of the raw, calculated, and processed data is saved in the database 124, it may be retrieved at any time through a graphical user interface of the Graphical User Interface System/Application Software 140. The graphical user interface has options to display charts 141, reports 142, data tables 143, statistical calculations 144, alerts 145, recommendations 146, analysis, 147 and support for the relevant data 148. As the user request each option, the graphical user interface software will pull the relevant data stored in the database 124. The graphical user interface may be implemented on propriety hardware or through an Internet based application and viewed through a web browser.

Figure 3:
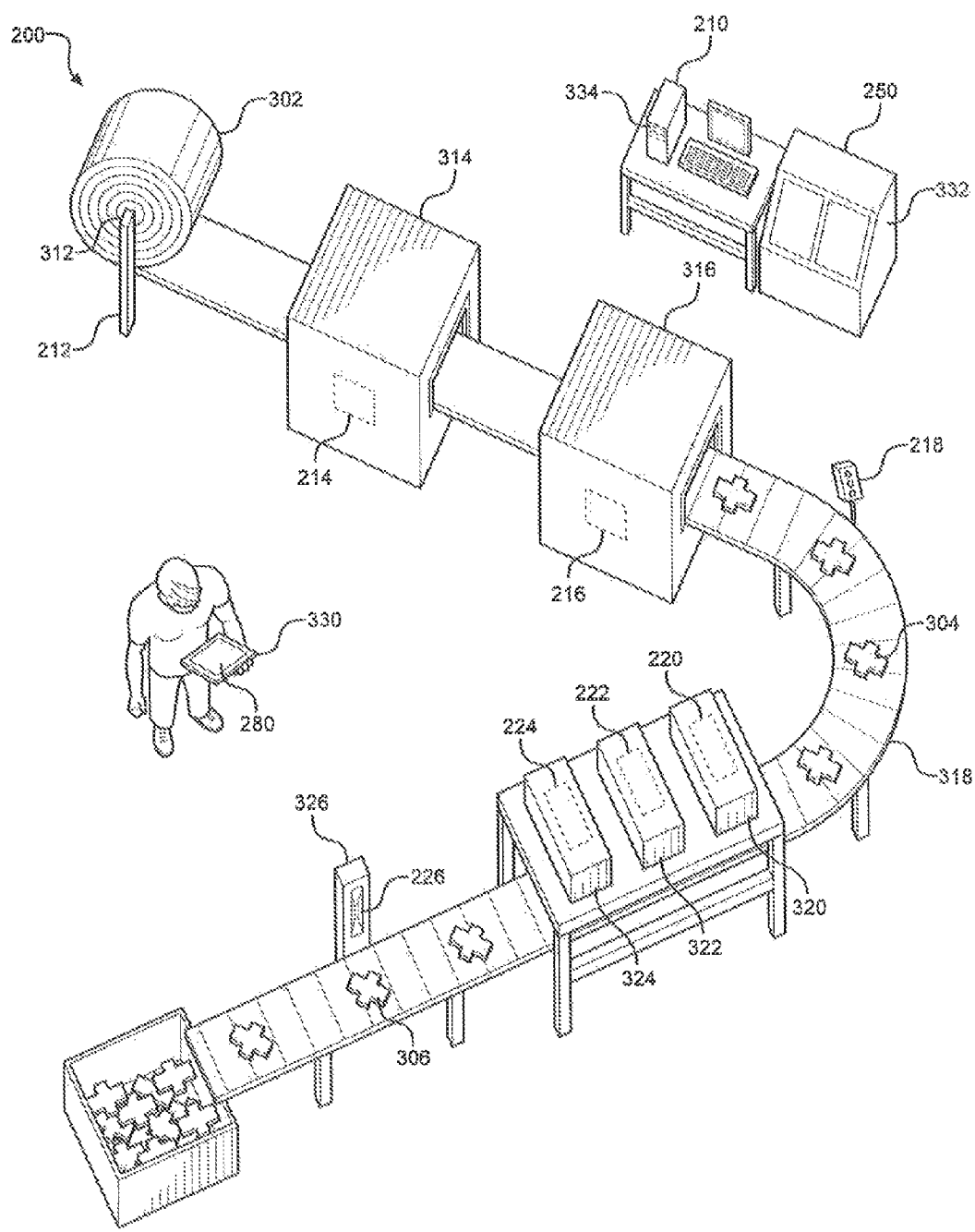
FIG. 3 is an embodiment of the Process Energy Intensity Monitoring and Diagnostic System monitoring a Customer's Production/Manufacturing Process on-site with a user accessing information from the Process Energy Intensity Monitoring and Diagnostic System through the use of a computer tablet.

Referring now to FIG. 3, an embodiment of the Process Energy Intensity Monitoring and Diagnostic System of the present invention is shown and generally designated 200. As shown, the Process Energy Intensity Monitoring and Diagnostic System 200 is monitoring the manufacturing process for the production of a stamped metal product. The manufacturing process shown is not meant to be limiting but is shown to illustrate the general concept of the production or manufacturing process which may be monitored by the Process Energy Intensity Monitoring and Diagnostic System 200 of the present invention. It is appreciated by those skilled in the art that the Process Energy Intensity Monitoring and Diagnostic System 200 may be implemented to monitor various types of manufacturing and production processes as well as any related processes. The system is generalizable to any process and the end-user will be able to monitor and evaluate the process in real-time.

The stamped metal manufacturing process consists of eight operations. Each operation has an associated machine or apparatus to perform the specified operation step. The initial operation is feeding the raw sheet metal material 302 to a sheet metal straightener 314 to straighten the material for insertion to a blanking press 316. The blanking press 316 presses a blank 304 from the raw sheet metal 302 and deposits the blank 304 onto a moving conveyor 318 while the scrap sheet metal is discarded. The conveyor 318 feeds the blank to a processing machine which consist of three operations. The blank is first drawn into a rough shape by stamping the blank through a form in the draw press 320. The drawn product is then processed through a subsequent trimming press 322 which trims the drawn product into a rough final shape. The rough final shape is then stamped further by the finishing press 324 into the finished product 306, further trimming the rough final shape and forming holes, slots, and other features in the final product 306. The final product 306 is then deposited back onto the conveyor 318 to move the product for collection. Before passing to collection, the product is counted by a product counter 326 and goes through quality control.

Each operation has an associated mechanical device. Each mechanical device Is attached with a sensor or monitor. The sheet metal feeder 312 is monitored by a sensor 212 measuring the electrical input, resource consumption value, required to feed the raw material to the sheet metal straightener 314. The sheet metal straightener 314 has an electrical sensor 214 measuring the electrical input required to straighten as well as feed the product to the blanking press 316. The blanking press 316 has an electrical sensor 216 to measure the electrical input required to the run the press to stamp a blank product 304. The conveyor 318 has a sensor 218 to monitor the electrical input required to transport the blank 308 from the blanking press 316 through the remaining process. The drawing press 320, the trimming press 322, and the finishing press 324 each have an electrical sensor, 220, 222, and 224 respectively, to monitor the energy Input required to perform each operation. The product counter 326 has an attached sensor 226 as well. Although all the sensors are electrical, the use of other types of mechanical devices using different input energy is contemplated, for example, the use of gas to run a furnace and water to cool down a part.

Each of the individual sensors is in electrical communication with a data acquisition device 211 (not shown) integrated in the Data Acquisition System 210. The Data Acquisition System 210 may be a stand-alone hardware unit or integrated into a computing device such as a personal computer, laptop, or tablet. As shown, the Data Acquisition System 210 is integrated into a personal computer 334. The sensors may be hard wired or may communicate wirelessly with the data acquisition device 211. The sensors measure the physical values and convert it into associated digital, analog, or communications protocol signals. The sensor signals are then converted into a useable and understandable sensor data for use by the Data Processing and Analysis System 250 integrated in an on-site computing hardware system such as a server, personal computer, laptop, or tablet. As shown, the Data Processing and Analysis System 250 is integrated into an on-site server 332. The Data Processing and Analysis System 250 processes the data and stores the processed data in its database for use by the Graphical User Interface System/Application Software 280. Although the Data Processing and Analysis System 250 is located on-site with the Data Acquisition System 210, it is not meant to be limiting. The Data Processing and Analysis System 250 may be located off-site and communicate to the Data Acquisition System 210 through the web.

As shown, the Graphical User interface System/Application Software 280 is being run on a tablet 330 by a user monitoring the manufacturing/production process. The Graphical User Interface System/Application Software gives a plurality of options to the user to view data, process data, compare data, or any other available data manipulation options.

Figure 4:
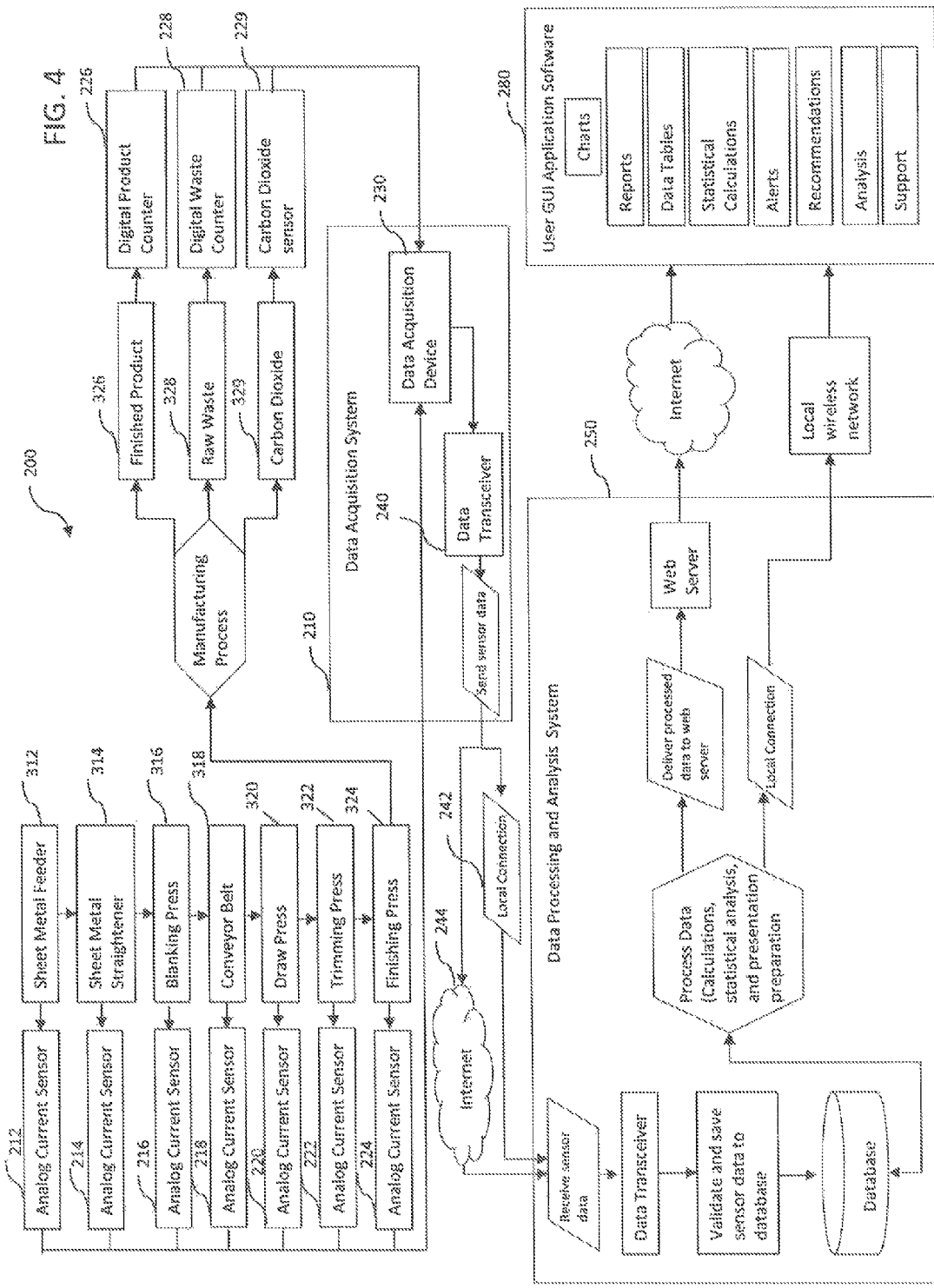
FIG. 4 is a block diagram of the exemplary embodiment of the Process Energy Intensity Monitoring and Diagnostic System monitoring a Customer's Production/Manufacturing Process of FIG. 3.

Referring now to FIG. 4, a block diagram of an exemplary embodiment of the Process Energy Intensity Monitoring and Diagnostic System 100 monitoring a Customer's Production/Manufacturing Process of FIG. 3 is shown.

The customer's production process for sheet metal stamping is shown and includes eight operations with each operation having an associated mechanical device. Each mechanical device consumes resources to perform the operation or creates resource waste. Each mechanical device is monitored by sensors to read the amount of resources consumed or byproducts created.

The data is transmitted to a data acquisition device 230 of the Data Acquisition System 210 to convert the raw sensor signals into user readable sensor data which is then logged and transmitted to the Data Processing and Analysis System 250. The data is received, stored, processed, and the processed data stored as well. The data is made available for user GUI Application Software 280 to use. The User GUI Application Software 280 is able to manipulate and display the data in many useful ways.

Figure 5:
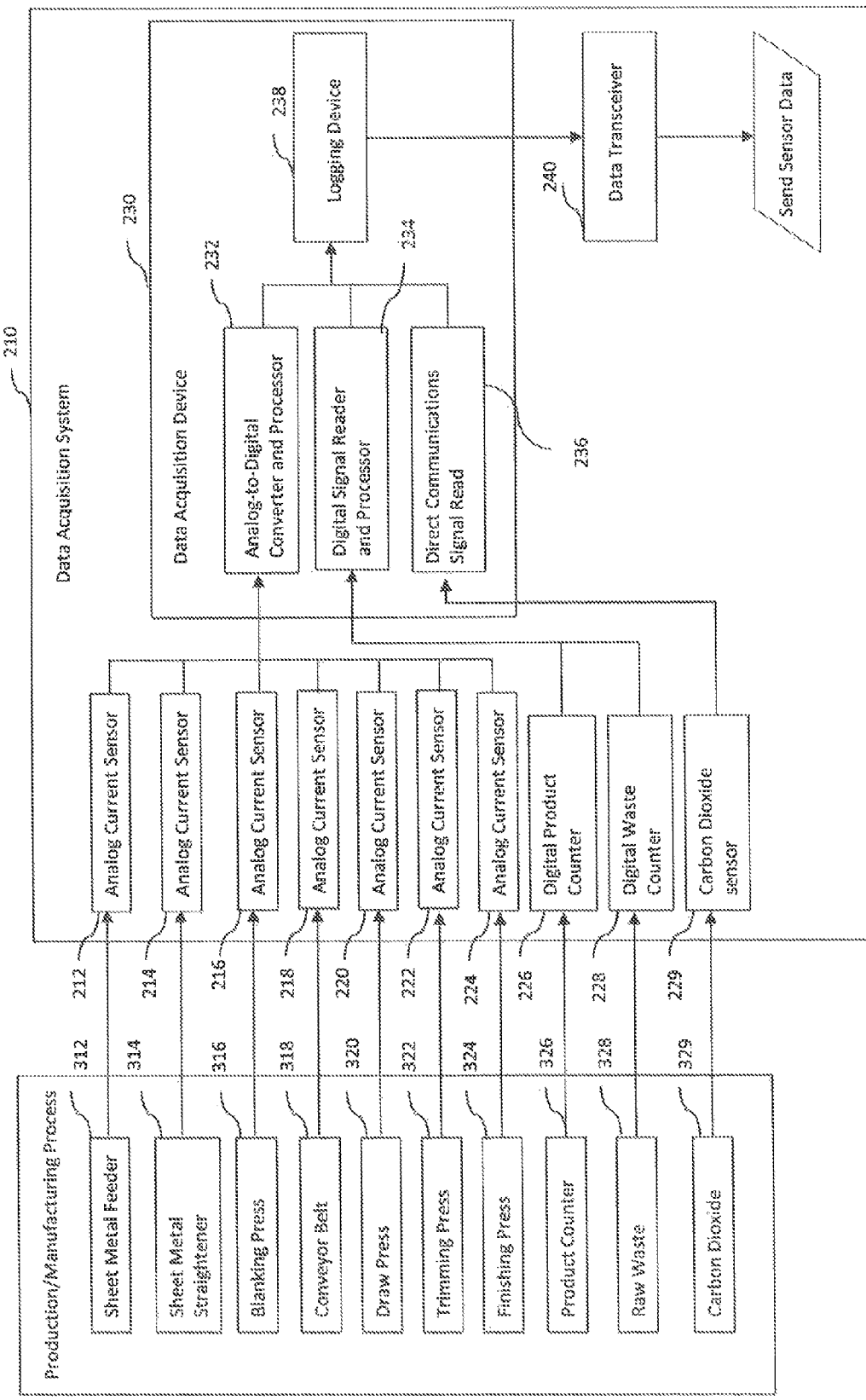
FIG. 5 is a diagram of the data acquisition system of the exemplary Process Energy Intensity Monitoring and Diagnostic System of the present invention with sensors and monitors attached to the individual machines and apparatuses of the production/manufacturing process.

Referring now to FIG. 5, an exemplary diagram of the Data Acquisition System 310 of FIG. 3 is shown. As shown the individual sensors are each connected to a respected machine or apparatus in the manufacturing process. Analog current sensors 212, 214, 216, 218, 220, 222, and 224 are used to measure the current draw of the sheet metal feeder 312, sheet metal straightener 314, blanking press 316, conveyor belt 318, draw press 320, trimming press 322, and finishing press 324, respectively. Digital sensors 226 and 228 are connected to the product counter 326 and the raw waste counter 328, respectively. A carbon dioxide sensor 229 is a stand-alone sensor providing a communications protocol signal (direct signal) reporting on the amount of exhausted carbon dioxide produced by the manufacturing process. All of the sensors are connected to the data acquisition device 230 through hard wired connections or through wireless connections.

The data acquisition device 230 includes an analog-to-digital converter and processor 232, a digital signal reader and processor 234, and a direct communications signal reader 236. The analog current sensors 212, 214, 216, 218, 220, 222, and 224 are connected to the analog-to-digital converter 232 to convert the signals into computer useable digital sensor data. The digital sensors 226 and 228 are connected to the digital signal reader and processor 234, which conditions them into useable digital sensor data. The communications protocol signal (direct signal) passes through unchanged to the direct communications signal reader 236. Ali of the sensor data is then stored in the logging device 238 and the data transceiver 240 sends the sensor data to the Data Processing and Analysis System 250.

Figure 6:
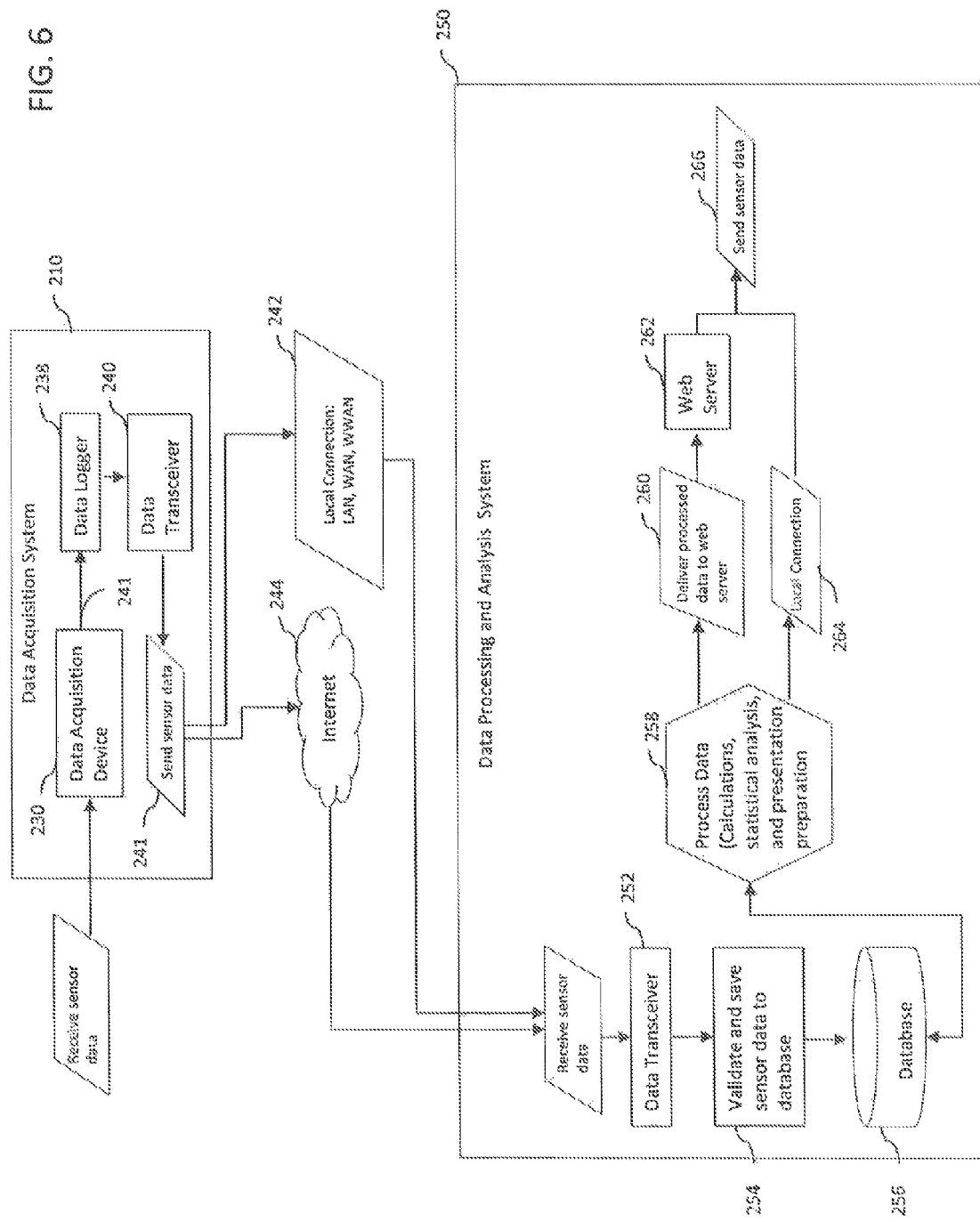
FIG. 6 is a block diagram of sensor data being transmitted between the Data Acquisition System and the Data Processing and Analysis System using either local connections or through the Internet.

Referring now to FIG. 6, a block diagram of the sensor data transmitted between the Data Acquisition System 210 and the Data Processing and Analysis System 250 using either local connections 242 or through the Internet 244 is shown. Once energy, resource, or production sensor data 231 is captured by the logging device 238, it is passed along a local network to a transmitting device 240, or system of transmitting devices, which are capable of sending the data over a LAN (local area network), a WAN (wide area network), or a WWAN (wireless WAN). On the receiving end of the transmission, resides another data transceiver 262 which is capable of receiving and validating the transmission 254. The Data Processing and Analysis System 250 can be off-site while the Data Acquisition System 210 is on-site, providing greater flexibility by allowing a single Data Processing and Analysis System 250 to function with multiple Data Acquisition Systems 210.

As shown in FIG. 3, the Data Processing and Analysis System 250 is integrated as part of an on-site server 332. Alternatively, the Data Processing and Analysis System 250 may be integrated into an off-site server. The server 332 provides the processing power required by the Data Processing and Analysis System 250 to process data 258 and perform its required operations such as calculations, statistical analysis, and presentation preparation. Additionally, the Data Processing and Analysis System 250 utilizes the server storage hardware such as the internal hard disk drive for its database 256. Further, the server 332 provides the communications hardware to communicate with the Data Acquisition System 210 and Graphical User Interface System/Software Application 280.

Figure 7:
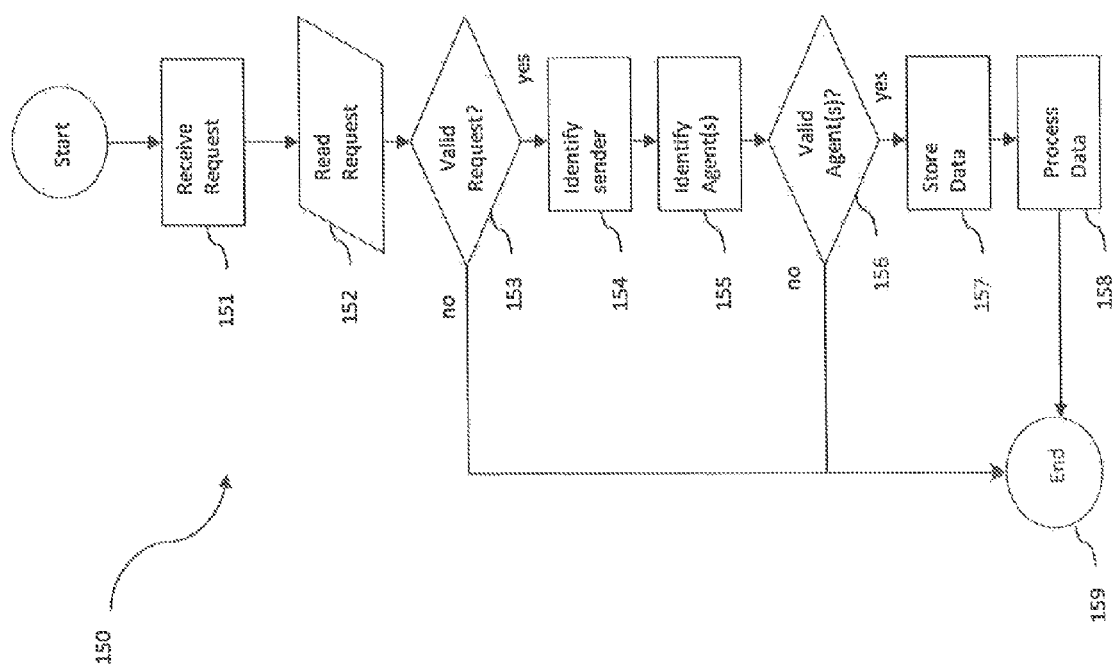
FIG. 7 is a flow chart of the validation procedure for transmitting data between the Data Acquisition System and Data Processing and Analysis system.

Referring now to FIG. 7, a flow chart of the validation procedure for transmitting data between the Data Acquisition System 110 and the Data Processing and Analysis System 120 is shown and designated 150. The first step 151 is to receive a request for data transmission which is read in step 152. The data receiving device will be capable of receiving direct transmissions from the data transmitting device. The next step 153 is to validate the request for data transmission which is performed by the data transceivers. If the request is invalid, the data transmission ends 159. If the transmission is determined to be from a valid sender, the data will be parsed to reveal: the sending network 154, one or more monitoring agents on the sending network 155, and the raw materials, energy and/or production sensor data being sent 157. Each agent will also be validated as being a valid data source in step 156. Once all senders are validated, and the data is determined to be from a valid source, the data is stored in a database accessible to the receiving device 157. After the data is stored, the data is processed in step 158.

Figure 8:
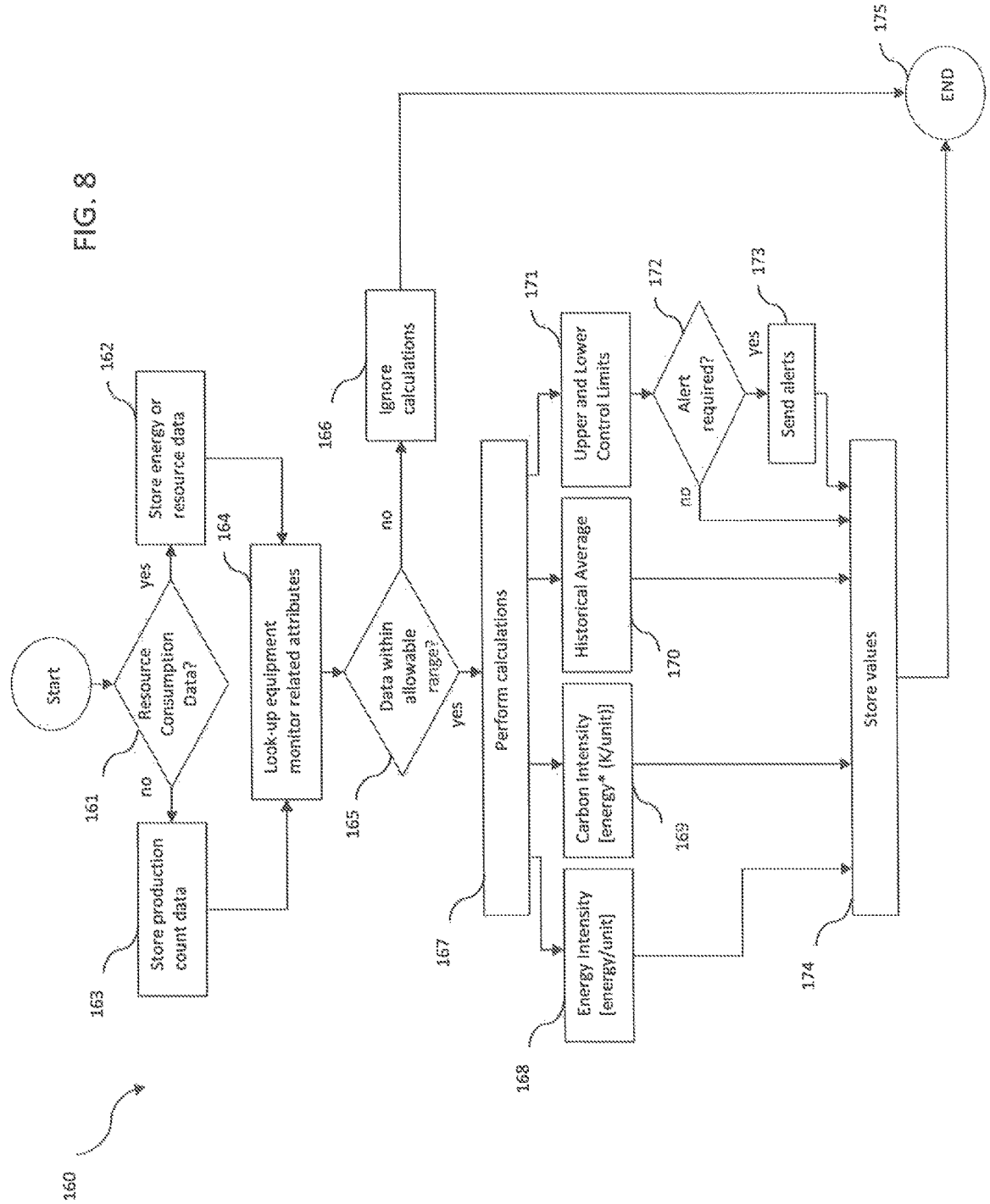
FIG. 8 is a flow chart showing the process of processing sensor data from the production/manufacturing process by the data processor of the Data Processing and Analysis System.

Referring now to FIG. 8, a flow chart showing the process of processing sensor data from the manufacturing process by the data processor of the Data Processing and Analysis System 120 is shown and designated 160. The Data Processing and Analysis System 120 is implemented into a server, personal computer, or other computing device. As a result, the Data Processing and Analysis System 120 utilizes the internal hardware, such as internal server processors and microprocessors, to process the data, perform calculations, and perform data analysis, among other tasks. The flow chart 160 shows a single loop of the data processor of the Data Processing and Analysis System 120 processing the received sensor data. The Data Processing and Analysis System 120 receives sensor data in real-time and the calculations are performed as the data is being received in real-time.

To begin processing the stored sensor data, the first step 161 for the data is to be parsed into resource consumption data 162, such as kWh, GILA, or other variable which denotes resource consumption, and final product production count data 163. Once the data is parsed, related data required to perform calculations, analysis, and processing are retrieved from the database in the next step 164. The data retrieved include constants, multipliers, and allowable ranges such as allowable data range, industry standard carbon constant, upper control limit, lower control limit, mean, and standard deviations among other available data.

Before proceeding, the next step 166 is to validate the data. The data is validated to determine if it is within a preferred range, and not the result of an energy spike or aberration. Data outside the allowable range is discarded in step 166 and the cycle ends for that data value and the next data value is processed. If the data is within the range, the data is used to perform calculations in step 167. At step 167, several calculations are performed. The calculations include, but are not limited to, the energy intensity 168, carbon intensity 169, historical average 170, and upper and lower control limits 171. At step 172, the received data is also cross-referenced with predetermined upper and low control limits to determine if an alert is required. If the data exceeds the control limits, an alert is sent.

Utilizing the stored and catalogued data for resource consumption and the number of products produced, the energy intensity and carbon intensity can be calculated. Energy intensity is obtained by dividing the energy consumption for the production period being monitored by the total production in that period. The carbon intensity is calculated without the use of the carbon dioxide sensor 34. Rather, carbon Intensity is obtained by multiplying the energy consumption for the production period being monitored, by an industry standard constant, and then dividing that by the total production in that period. After the energy and carbon intensity is calculated, the processing stage will combine current data with historical data to calculate statistical factors, such as the mean and standard deviation. The preferred range for any data point is determined by calculating the mean and standard deviation of all recent data points for the same measurement, and then ensuring that the new data point exists within a positive or negative three (3) standard deviations of the mean. These preferred ranges are called the upper control limit (UCL) and lower control limit (LCL).

The final step 174 is storing all values in a database. Once all of the raw, calculated, and processed data is saved in a database, it may be retrieved at any time through a graphical user interface. The graphical user interface has options to display charts, reports, data tables, statistical calculations, alerts, recommendations, analysis, and support for the relevant data. As the user request each option, the graphical user interface software will pull the relevant data stored in the database.

Figure 9:
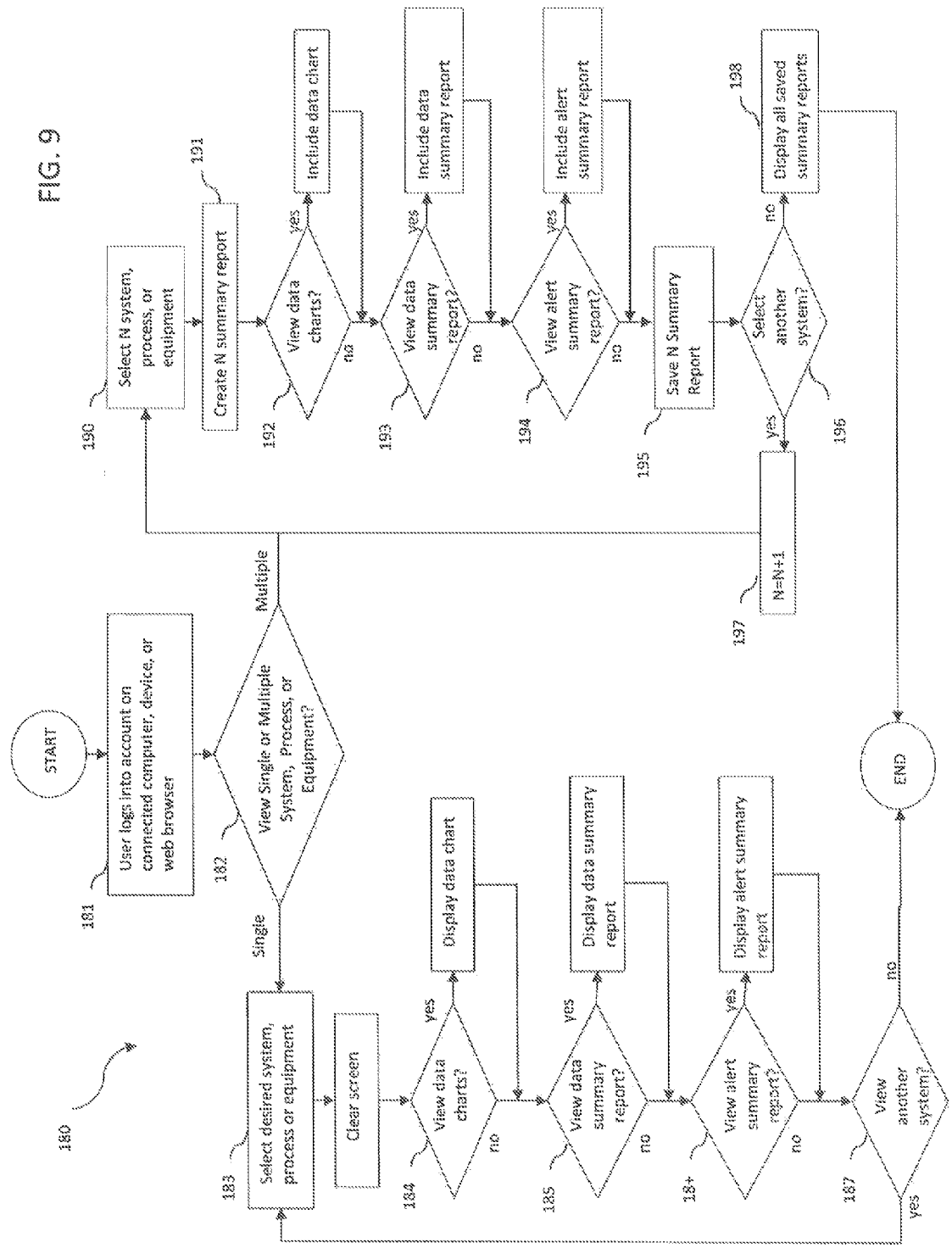
FIG. 9 is a flow chart showing the process of choosing which system, process, or equipment to monitor and its related information.

Referring now to FIG. 9, a flow chart showing the process of choosing which system, process, or equipment to monitor and its related information is shown and designated 180.

The Process Energy Intensity Monitoring and Diagnostic System 100 data and information may be accessed via a computer software program; an application on a connected device, such as a smartphone, tablet, or wearable computer; or a web browser that is installed on any of the aforementioned devices which has the appropriate Graphical User Interface System/Application Software installed. A user accesses the information by choosing a compatible device with the Graphical User Interface System/Application Software installed and connecting to the system either through a local connection or through the web.

To access energy or production data the user must have a user or account specific login. Upon successful login 181, the system will detect which account the login is a member of, and direct the user to a number of menus containing lists of their account's sites, systems, processes, and equipment, being monitored, transmitted, and stored.

Initially at step 182, the user will select a site, system, process, or equipment from a menu, and be presented with the option to view their real-time energy, resource, and production data, calculations, and statistics, in the form of charts, tables, or reports. They may also elect to see any historical data, or current and/or historical alerts. A number of specialized reports may also be available to the user, which would compare energy and production data across a number of sites, systems, processes, or equipment. As shown, the available information is data charts, data summary reports, or alert summary reports for the selected system, process or equipment.

If a user wishes to see a data for a single system, they will be taken to step 183. After selecting the desired system, process, or equipment, the user will choose to view data charts 184, view data summary reports 185, or view alert summary reports 186. The data charts 184 include, but are not limited to, real-time values for sensor data, energy intensity, carbon intensity, upper and lower control limits, and historical average. It is contemplated that other values may be calculated and also available such as statistical values. The data summary reports 185 summarizes the information and updates the summary in real-time as the real-time data is received and calculated. The alert summary reports 186 are updated in real-time to include the continually updated data as well. If a chooser chooses yes at each step, the appropriate data will be retrieved and displayed. If a chooser chooses no, the data is not retrieved and will not be displayed. At step 187, a user is prompted if they would like to select and view another system, process, or equipment. If no, the loop ends. If yes, the loop is restarted and a new selection screen is presented.

Instead of viewing a single system, process, or equipment, if available, the user may choose to make system, process, or equipment summary reports for multiple systems, processes, or equipment. In step 190, the user chooses the appropriate system, process, or equipment. In response, step 191 creates a summary report for the system, process or equipment. The summary reports can include data charts 192, data summary reports 193, and alert summary reports 194. The data charts 192, data summary reports 193, and alert summary reports 194 are the same available charts for a single system, process, or equipment as selected in step 183. If a user chooses to include the prompted data at each of steps 192, 193, and 194, the data will be retrieved in the summary report and saved in step 195. The use and display of data charts, data summary reports, and alert summary reports is not meant to be limiting and various other types of data may be displayed such as historical mean. It is appreciated by those skilled in the art that various other types of data may be useful and may be made available.

Once the charts have been chosen and the summary report is saved, at step 196 a determination is made on whether to proceed with an additional summary report or end. If another summary report is chosen to be made, a new summary report number is created in step 197 and the loop begins at step 190. Once all summary reports are created, the loop ends at step 198 and all summary reports are displayed. As described, this is only one particular method of choosing and displaying data. Various other methods are possible and are contemplated by the present invention.

Referring now to FIG. 10, a flow chart of the alerting a user when energy, resource, production, or intensity values exceed a statistical or preferred range is shown and generally designate 400.

When an energy, resource, production, energy intensity, or carbon intensity data point is determined to be outside of a statistical or preferred range during the processing stage, the invention will attempt to deliver an "alert". An alert is described as a fast and timely message explaining an aberration in the received data, which will be delivered to predetermined users at the production facility. This alert may also contain information about how to correct or troubleshoot the aberration. An alert may be delivered via email, SMS, or any other means which could reach the actor at their whereabouts. The preferred method of alert can be configured by each actor within the system, and the system will check the configuration for each actor prior to sending the alert.

In step 401, when an alert is received, the system obtains the list of users assigned to receive the alerts. The next step 402 obtains the alert details. In step 403 a user is selected and the information regarding that user is retrieved. In step 404, a determination of whether the user is subscribed to e-mail notifications is made. If no, proceed to step 410, if yes proceed to step 405. Step 405 compose the e-mail with the alerts, step 406 gets SMTP settings, and step 407 sends the e-mail with the alert. In step 410, a determination on whether the user is subscribed to receive SMS messages is made. If no, proceed to step 414. If yes proceed to step 411 to compose the SMS alert. Step 412 gets the SMS settings and step 413 sends the SMS to the user. Step 414 makes a determination if the current user is the last user or not. If yes, the alerting system ends. If no, the next user is select in step 415 and the loop begins for the new user at step 403.

While there have been shown what are presently considered to be preferred embodiments of the present invention, it will be apparent to those skilled in the art that various changes and modifications can be made herein without departing from the scope and spirit of the invention.

The invention claimed is:

1. A process energy intensity monitoring and diagnostic system comprising:
   a data acquisition system comprising a plurality of sensors including a plurality of resource consuming sensors, a plurality of energy consuming sensors, and a production output sensor, each of said sensors outputting a corresponding sensor data, a data acquisition device, and a data transceiver, said data acquisition device monitoring said plurality of sensors and said data transceiver transmitting said sensor data;
   a data processing and analysis system comprising a database, a data processor, and data transceiver, said data transceiver receiving said sensor data and transmitting said sensor data to said data processor, said data processor configured to calculate an energy intensity from said resource consuming sensors, said energy consuming sensors, and said production output sensor;
   a graphical user interface software application comprising a data transceiver, a data processor, and a graphical user interface, said data graphical user interface software application data transceiver receiving said energy intensity data; and
   wherein said energy intensity values calculated by said data processing and analysis system provides a user with the energy consumption, energy efficiency, and cost-effectiveness, on a per unit basis.

2. The process energy intensity monitoring and diagnostic system of claim 1, wherein said data acquisition device further comprises an analog-to-digital converter, a digital signal reader, a direct communications reader, and a logging device, said logging device logging said sensor data from said plurality of sensors.

3. The process energy intensity monitoring and diagnostic system of claim 2, wherein said plurality of sensors are connected to a machine corresponding to an operation in a manufacturing process.

4. The process energy intensity monitoring and diagnostic system of claim 3, wherein said machine has a resource consumption value and said connected sensors measures said resource consumption value and outputs said sensor data.

5. The process energy intensity monitoring and diagnostic system of claim 4, wherein said data transceiver has a means to transmit said sensor data through a local connection or through an internet connection.

6. The process energy intensity monitoring and diagnostic system of claim 5, wherein said data transceiver of said data processing and analysis system has a means to transmit and receive said sensor data through said local connection or said internet connection.

7. The process energy intensity monitoring and diagnostic system of claim 6, wherein said graphical user interface of said graphical user interface software application further comprises charts, reports, data tables, statistical calculations, alerts, recommendations, analysis, and support menus.

8. The process energy intensity monitoring and diagnostic system of claim 7, wherein said data acquisition system is integrated with a first computing device.

9. The process energy intensity monitoring and diagnostic system of claim 8, wherein said data processing and analysis system is integrated with a second computing device, said second computing device separate from said first computing device.

10. The process energy intensity monitoring and diagnostic system of claim 9, wherein said graphical user interface system/application software is integrated with a third computing device, said third computing device separate from said first computing device and said second computing device.

* * * * *